(12) United States Patent
Liu et al.

(10) Patent No.: US 10,936,099 B2
(45) Date of Patent: Mar. 2, 2021

(54) TOUCH DISPLAY PANEL AND TOUCH DISPLAY DEVICE

(71) Applicant: Yungu (Gu'an) Technology Co., Ltd., Langfang (CN)

(72) Inventors: Jiading Liu, Kunshan (CN); Bing Wang, Kunshan (CN); Junyuan Ma, Kunshan (CN); Yapeng Zhang, Kunshan (CN)

(73) Assignee: Yungu (Gu'an) Technology Co., Ltd., Langfang (CN)

( * ) Notice: Subject to any disclaimer, the term of this patent is extended or adjusted under 35 U.S.C. 154(b) by 0 days.

(21) Appl. No.: 16/406,441

(22) Filed: May 8, 2019

(65) Prior Publication Data
US 2019/0265827 A1 Aug. 29, 2019

Related U.S. Application Data

(63) Continuation of application No. PCT/CN2018/096965, filed on Jul. 25, 2018.

(30) Foreign Application Priority Data

Nov. 30, 2017 (CN) .......................... 201711243264.X (51) Int. Cl.
*G09G 3/30* (2006.01)
*G06F 3/041* (2006.01)
*G06F 3/044* (2006.01)

(52) U.S. Cl.
CPC ............ *G06F 3/0412* (2013.01); *G06F 3/044* (2013.01); *G06F 3/0418* (2013.01); *G06F 3/0443* (2019.05); *G06F 3/0445* (2019.05); *G06F 3/0446* (2019.05); *G06F 3/0448* (2019.05); *G06F 2203/04103* (2013.01); *G06F 2203/04111* (2013.01)

(58) Field of Classification Search
CPC ..................... G09G 3/30–3291; G06F 3/044
See application file for complete search history.

(56) References Cited

U.S. PATENT DOCUMENTS

| 2013/0300678 A1 | 11/2013 | Kang et al. |
| 2014/0160368 A1* | 6/2014 | Huang .................... G06F 3/044 349/12 |

(Continued)

FOREIGN PATENT DOCUMENTS

| CN | 204650473 U | 9/2015 |
| CN | 105679805 A | 6/2016 |

(Continued)

OTHER PUBLICATIONS

International Search Report dated Oct. 18, 2018 in corresponding International application No. PCT/CN2018/096965; 3 pages.

(Continued)

*Primary Examiner* — Sanghyuk Park
(74) *Attorney, Agent, or Firm* — Maier & Maier, PLLC (57) ABSTRACT

A touch display panel and a touch display device. The touch display panel includes a cathode and a number of touch electrodes. The cathode includes at least one excavated area. The position of cathode corresponds to that of the touch electrode, thereby reducing the relative area between the cathode and the touch electrode.

16 Claims, 6 Drawing Sheets

(56) References Cited

U.S. PATENT DOCUMENTS

| | | | |
|---|---|---|---|
| 2016/0034091 A1* | 2/2016 | Cheng | G06F 3/0412 |
| | | | 345/174 |
| 2016/0170524 A1* | 6/2016 | Kim | G06F 3/0443 |
| | | | 345/174 |
| 2017/0269745 A1* | 9/2017 | Ding | H01L 51/5221 |
| 2018/0095581 A1* | 4/2018 | Hwang | G06F 3/0445 |
| 2018/0188837 A1* | 7/2018 | Son | G06F 3/0412 |
| 2019/0043927 A1* | 2/2019 | Jang | G06F 3/044 |

FOREIGN PATENT DOCUMENTS

| | | |
|---|---|---|
| CN | 106648213 A | 5/2017 |
| CN | 106775039 A | 5/2017 |
| CN | 106775062 A | 5/2017 |
| CN | 206657340 U | 11/2017 |
| CN | 108153445 A | 6/2018 |
| TW | 201001262 A | 1/2010 |
| WO | 2017/060672 A1 | 4/2017 |

OTHER PUBLICATIONS

Taiwanese Office Action dated Apr. 8, 2019 in connection with corresponding TW Application No. 107126774; 7 pages including Partial English-language translation.

* cited by examiner

TOUCH DISPLAY PANEL AND TOUCH DISPLAY DEVICE

FIELD OF THE DISCLOSURE

The disclosure relates to the field of display technologies, and in particular, to a touch display panel and a touch display device.

BACKGROUND

The touch display panel integrates a touch screen with a flat display panel to enable a flat display panel with a touch function. Generally, the touch display panel may provide a human-computer interactive interface, and allows input through fingers, a stylus, etc., which is more direct and more humanized in use. With the development of display technologies, touch display panels are increasingly used in various display devices.

With the development of thin type of the touch display panel, the thickness of the touch display panel is becoming thinner and thinner. For the cathode and the touch electrodes in the touch display panel, a distance between the two is closer and closer. However, in practical applications, since the distance between the cathode and the touch electrode is relatively close, when the touch display panel is touched, the cathode may interfere with the touch electrode, resulting in a decrease in detection sensitivity of the touch display panel. The touch function of the touch display panel is damaged or even disabled.

SUMMARY

The main purpose of the disclosure is to provide a touch display panel and a touch display device, which are intended to solve the following problem in the prior touch display panel: owing to the distance between the cathode and the touch electrode being relatively close, the cathode may interfere with the touch electrode, which affects the touch function of the touch electrodes.

To solve the above problem, the embodiments of the disclosure provides a touch display panel, including a cathode comprising one or more excavated areas and a plurality of touch electrodes, the positions of the one or more excavated areas correspond to the positions of the touch electrodes to reduce a relative area between the cathode and the touch electrodes.

Optionally, the touch electrodes comprise one or more inductive electrodes, wherein the positions of the excavated areas correspond to the positions of the inductive electrodes to reduce the relative area between the cathode and the inductive electrodes.

Optionally, the positions of one or more of the excavated areas correspond to the position of one inductive electrode.

Optionally, the shapes of the excavated areas are the same as the shape of the one inductive electrode corresponding to the positions thereof, and the area of one or more of the excavated areas corresponding to the one inductive electrode is not larger than the area of the one inductive electrode.

Optionally, the touch electrodes further comprise one or more drive electrodes, wherein
a plurality of the drive electrodes and a plurality of the inductive electrodes are located in the same conductive layer; or
a plurality of the drive electrodes and a plurality of the inductive electrodes are located in different conductive layers.

Optionally, each of the inductive electrodes that intersects at least one of the drive electrodes includes one or more electrode areas, and each of the excavated areas has a position corresponding to that of one of the electrode areas.

Optionally, the shapes of the one or more excavated areas are the same as the shapes of the one or more electrode areas corresponding to the positions thereof, and the area of the one or more excavated areas is not larger than the area of the one or more electrode areas.

Optionally, each of the inductive electrodes includes a plurality of sequentially connected inductive sub-electrodes, and the shape of the inductive sub-electrodes includes at least one of a diamond shape and a strip shape.

Each of the drive electrodes comprises a plurality of sequentially connected drive sub-electrodes, and the shape of the drive sub-electrodes comprises at least one of a diamond shape and a strip shape.

Optionally, a plurality of the inductive electrodes are along a first direction, a plurality of the drive electrodes are along a second direction, and the first direction and the second direction intersect each other.

Optionally, a plurality of the inductive electrodes and a plurality of the drive electrodes are made of transparent conductive material or metal material.

Optionally, a plurality of the electrode areas intersecting the inductive electrodes with the drive electrodes comprises bridges for connecting a plurality of inductive sub-electrodes.

Optionally, a plurality of the inductive sub-electrodes are sequentially connected by first conductive bridges, and a plurality of the drive sub-electrodes are sequentially connected by second conductive bridges, wherein the first conductive bridges and the second conductive bridges are insulated from each other.

Optionally, the first conductive bridges and the second conductive bridges are arranged in different conductive layers.

The embodiments of the disclosure also provide a touch display device, including the touch display panel recorded above.

The following technical effects can be achieved by at least one of the technical solutions provided by embodiments of the disclosure:

The embodiments of the present disclosure provide a touch display panel and a touch display device, the touch display panel including a cathode and a plurality of touch electrodes, wherein the cathode includes at least one excavated area, the positions of which correspond to those of the touch electrodes, thereby reducing the relative area between the cathode and the touch electrode. For the touch display panel provided by the embodiments of the disclosure, with the area of the cathode of the touch display panel corresponding to the touch electrodes being excavated, the relative area between the touch electrodes and the cathode may be reduced, thereby reducing the inductive capacitance between the touch electrodes and the cathode. In this way, when the touch display panel is touched, since the inductive capacitance between the cathode and the touch electrodes becomes smaller, the interference of the cathode to the touch electrodes can be effectively reduced. Compared with the prior art, the damage to the touch function of the touch display panel may be reduced, further improving the touch sensitivity of the touch display panel.

BRIEF DESCRIPTION OF THE DRAWINGS

In order to more clearly illustrate the embodiments of the disclosure or the technical solutions in the prior art, the drawings to be used in the embodiments or the description of the prior art will be briefly described below. Obviously, the drawings in the following description are only some embodiments of the disclosure, and other drawings may be obtained according to the structures shown in the drawings by a person skilled in the art without paying any creative work.

The implementation, functional features and advantages of the disclosure will be further described with reference to the accompanying drawings.

DETAILED DESCRIPTION OF PREFERRED EMBODIMENTS

In the existing touch display panel, the distance between the touch electrode and the cathode is relatively close, thus the touch sensitivity of the touch display panel may be influenced by the cathode. The cathode mainly affects a detection sensitivity of the inductive electrode in the touch electrode, thereby affecting the touch sensitivity of the touch display panel. Specifically, when the touch display panel is touched, owing to the distance between the cathode and the inductive electrode being relatively close, so that the change in capacitance caused by the touch actually detected by the inductive electrode is small, and the detection sensitivity of the inductive electrode is low, thereby affecting the touch sensitivity of the touch display panel.

Figure 1:
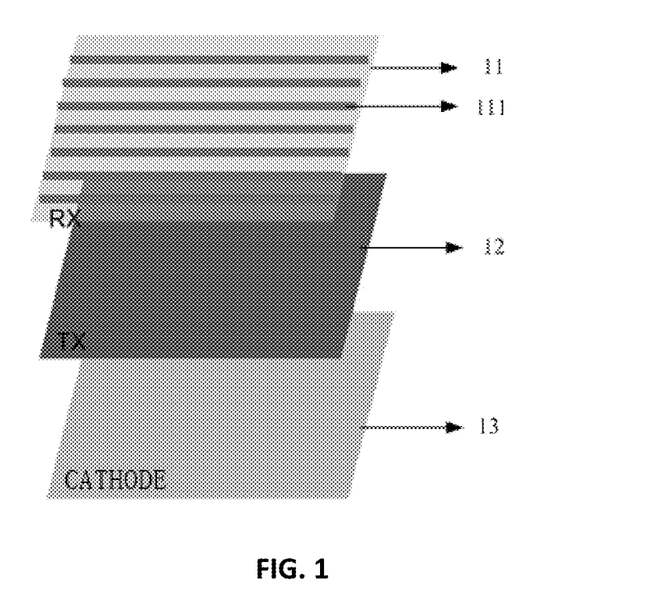
FIG. 1 is a schematic structural view of a touch display panel in the prior art.

As shown in FIG. 1, FIG. 1 is a schematic structural view of a touch display panel in the prior art. In FIG. 1, the touch display panel may include an inductive electrode layer 11, a drive electrode layer 12, and a cathode layer 13. The top and bottom positional relationship of the three may be: the inductive electrode layer 11, the drive electrode layer 12, and the cathode layer 13. The inductive electrode layer 11 includes a plurality of inductive electrodes 111 (RX), the drive electrode layer 12 includes a plurality of drive electrodes (TX, not specifically shown in FIG. 1), and the cathode layer 13 can be regarded as a cathode. In FIG. 1, the distance between the inductive electrode layer 11 and the cathode layer 13 is relatively close, that is, the distance between the inductive electrode 111 and the cathode is relatively close.

When the touch display panel shown in FIG. 1 is touched, owing to the distance between the inductive electrode 111 and the cathode being relatively close, the inductive capacitance between the inductive electrode 111 and the cathode is large, leading to the consequence that actually detected change in capacitance by the inductive electrode 111 is small, even the change in capacitance may not be detected, resulting in low detection sensitivity of the inductive electrode 111 and low touch sensitivity of the touch display panel.

In order to solve the above technical problems, the embodiments of the present disclosure provide a touch display panel and a touch display device, the touch display panel including a cathode and a plurality of touch electrodes, wherein the cathode includes one or more excavated areas, the positions of which correspond to those of the touch electrodes, thereby reducing the relative area between the cathode and the touch electrodes.

For the touch display panel provided by the embodiments of the disclosure, with the area of the cathode of the touch display panel corresponding to the touch electrodes being excavated, the relative area between the touch electrodes and the cathode may be reduced, thereby reducing the inductive capacitance between the touch electrodes and the cathode. In this way, when the touch display panel is touched, since the inductive capacitance between the cathode and the touch electrodes becomes smaller, the interference of the cathode to the touch electrodes can be effectively reduced. Compared with the prior art, the damage to the touch function of the touch display panel may be reduced, further improving the touch sensitivity of the touch display panel.

The technical solutions of the disclosure are clearly and completely described below in conjunction with the specific embodiments of the disclosure and the corresponding drawings. It is apparent that the described embodiments are only a part of the embodiments of the disclosure, are not limited to these descriptions. For the person skilled in the art of the disclosure, without departing from the concept of the disclosure, simple deductions or substitutions may be made based on the embodiments of the disclosure and should be included in the protection scope of the application.

The main idea of improving the touch sensitivity of the touch display panel in the embodiments of the disclosure is that the area between the touch electrodes and the cathode may be reduced by the area in the cathode of the touch display panel corresponding to the touch electrodes being partially or completely excavated, and further the inductive capacitance between the touch electrodes and the cathode may be reduced. When the touch display panel is touched, a large change in capacitance can be detected by the touch electrodes, thereby improving the touch sensitivity of the touch display panel.

The touch display panel provided by the embodiments of the disclosure may be an on-cell or an out-cell or an in-cell touch display panel. The touch display panel may be applied to various modes of the display panel, and is not specifically limited herein.

In the touch display panel provided by the embodiments of the disclosure, a plurality of the inductive electrodes and a plurality of the drive electrodes may be located in the same or different conductive layer, wherein a plurality of the inductive electrodes and a plurality of the drive electrodes are made of transparent conductive material, including but not limited to ITO (Indium Tin Oxide); AgNW (silver nanowire), graphene, etc., or metal material such as metal mesh.

It should be noted that, in the touch display panel provided by the embodiments of the disclosure, the touch electrodes may include one or more inductive electrodes and one or more drive electrodes. And at least one of the excavated areas included in the cathode may correspond to the positions of the inductive electrodes; or correspond to the positions of the drive electrodes; or a part of the excavated areas may correspond to the positions of the inductive electrodes and the other part may correspond to the positions of the drive electrodes, which is not specifically limited herein.

However, in practical applications, generally, the interference of the cathode to the inductive electrodes is greater than the interference of the cathode to the drive electrodes. Therefore, as a preferred embodiment, at least one of the excavated areas included in the cathode may correspond to the positions of the inductive electrodes.

The technical solution provided by the embodiments of the disclosure will be described in detail below with reference to the accompanying drawings.

Embodiment 1

Figure 2:
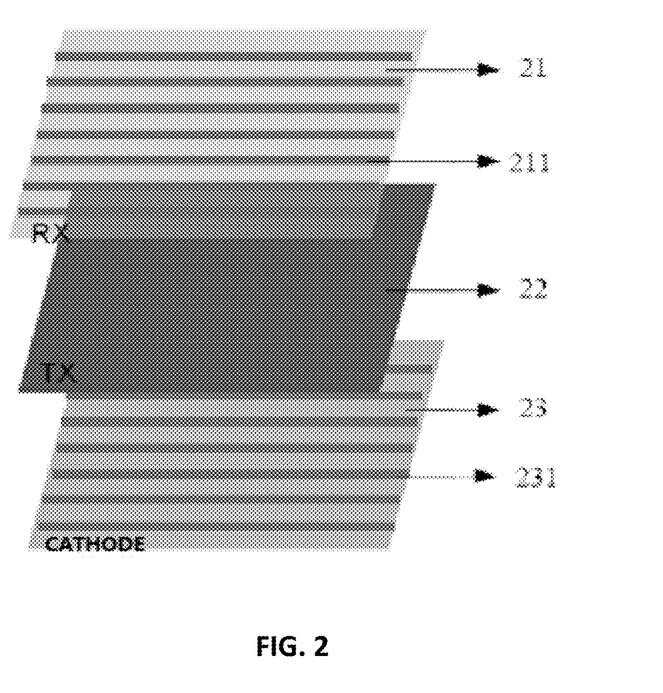
FIG. 2 is a schematic structural view of a touch display panel according to an embodiment of the disclosure.

FIG. 2 is a schematic structural view of a touch display panel according to an embodiment of the disclosure. The touch display panel is as follows.

The touch display panel shown in FIG. 2 may include an inductive electrode layer 21, a drive electrode layer 22, and a cathode layer 23. The upper and lower positional relationship of the three may be: the inductive electrode layer 21, the drive electrode layer 22, and the cathode layer 23. The inductive electrode layer 21 includes a plurality of inductive electrodes 211. The drive electrode layer includes a plurality of drive electrodes 22 (not specifically shown in FIG. 2), and the cathode layer 23 may be regarded as a cathode of the touch display panel.

In FIG. 2, the cathode may include a plurality of excavated areas 231, and the number of the excavated areas 231 is the same as the number of inductive electrodes 211 (seven inductive electrodes 211 and seven excavated areas 231 are shown in FIG. 2). There is one-to-one correspondence between the position of each excavated area 231 and the position of each of the inductive electrodes 211.

In this way, for the entire cathode, the relative area between the cathode and the inductive electrodes may be reduced, thereby reducing the inductive capacitance between the cathode and the inductive electrodes. When the touch display panel is touched, the interference of the cathode to the inductive electrodes may be effectively reduced, thereby improving the touch sensitivity of the touch display panel.

It should be noted that, in the touch display panel shown in FIG. 2, the number of the excavated areas included in the cathode may be less than that of the inductive electrodes. For example, the cathode of the touch display panel shown in FIG. 2 may include five excavated areas, and the position of each of the excavated areas may correspond to that of one inductive electrode (i.e., there are cathode areas corresponding to two inductive electrode positions, which are not excavated). Thus, for the entire cathode, the relative area between the cathode and the inductive electrodes may also be reduced, thereby reducing the interference of the cathode to the inductive electrodes.

In addition, the number of the excavated areas included in the cathode may be greater than that of the inductive sub-electrodes included in the inductive electrode. For example, for one inductive electrode shown in FIG. 2, the cathode area corresponding to the position thereof may be excavated to obtain two or more excavated areas, and the positions of these excavated areas correspond to the inductive electrode. Thus the relative area between the cathode and the inductive electrode can be reduced, thereby reducing the interference of the cathode to the inductive electrode.

In practical applications, the number of the excavated areas included in the cathode may be determined according to the sensitivity requirement of the inductive electrodes, and is not specifically limited herein. As a preferred embodiment, it may be determined that the number of the excavated areas included in the cathode is the same as that of the inductive electrodes, and there is one-to-one correspondence between the positions of the excavated areas and those of the inductive electrodes.

In FIG. 2, the shape of each excavated area 231 may be the same as that of the inductive electrode 211, that is, each excavated area 231 may have a strip shape, and the area of each excavated area 231 may be equal to that of the inductive electrode 211 corresponding to the position thereof. Thus, for the entire cathode, the relative area between the cathode and the inductive electrodes may be minimized, thereby effectively reducing the interference of the cathode to the inductive electrodes.

In addition, the area of each of the excavated areas 231 in FIG. 2 may also be smaller than the area of the inductive electrodes 211 corresponding to the positions thereof, such that for the entire cathode, on the premise that the relative area between the cathode and the inductive electrodes may be reduced, the display function of the cathode is insured, as much as possible, not to be damaged. The specific area of each of the excavated areas 231 may be determined according to the detection sensitivity requirement of the inductive electrodes or the touch sensitivity requirement of the touch display panel, and is not specifically limited herein.

The touch display panel provided by the embodiments of the disclosure includes a cathode and a plurality of inductive electrodes, wherein the cathode includes at least one excavated area, and the position of each excavated area corresponds to that of an inductive electrode to reduce the relative area between the cathode and the inductive electrodes. In this way, for the entire cathode, with the area of the cathode of the touch display panel corresponding to the inductive electrodes being excavated, the relative area between the inductive electrodes and the cathode may be reduced, thereby reducing the inductive capacitance between the inductive electrodes and the cathode. In this way, when the touch display panel is touched, since the inductive capacitance between the cathode and the inductive electrodes becomes smaller, the interference of the cathode to the inductive electrodes can be effectively reduced. Compared with the prior art, the change in the capacitance detected by the inductive electrodes can be increased, thereby improving the detection sensitivity of the inductive electrodes, further improving the touch sensitivity of the touch display panel.

Embodiment 2

Figure 3:
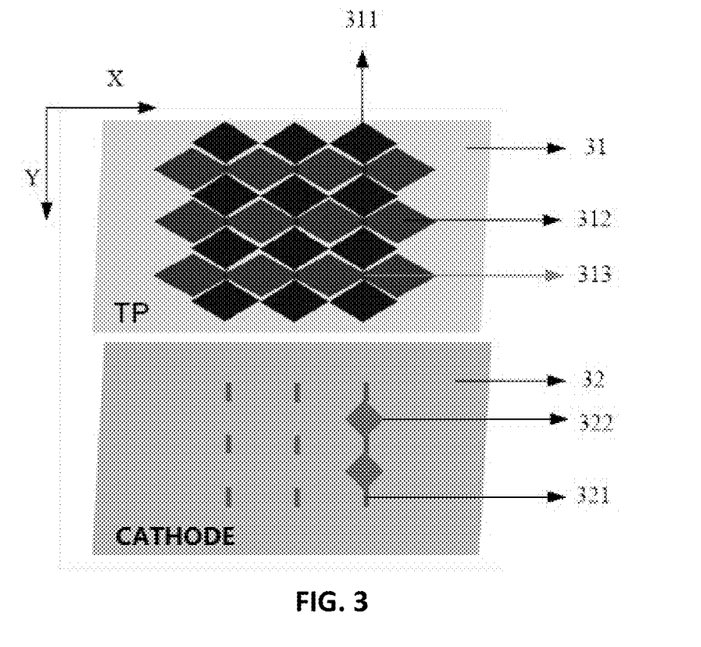
FIG. 3 is a schematic structural view of another touch display panel according to an embodiment of the disclosure.

FIG. 3 is a schematic structural view of another touch display panel according to an embodiment of the disclosure. The touch display panel is as follows.

The touch display panel as shown in FIG. 3 includes a touch electrode layer 31 and a cathode layer 32. The touch electrode layer 31 may be located above the cathode layer 32. The touch electrode layer 31 may include a plurality of inductive electrodes 311 and a plurality of drive electrodes 312. The cathode layer 32 may be regarded as the cathode of the touch display panel.

In FIG. 3, a plurality of the inductive electrodes 311 and a plurality of the drive electrodes 312 are located on the same conductive layer 31 (i.e., the touch electrode layer 31) and intersect each other, wherein a plurality of the inductive electrodes 311 may be arranged in a first direction (X-direction in FIG. 3), and a plurality of the drive electrodes 312 may be arranged in a second direction (Y-direction in FIG. 3). The first direction intersects the second direction. In the embodiments of the disclosure, a plurality of the inductive electrodes 311 and a plurality of the drive electrodes 312 may be made of transparent conductive material or metal material.

For one inductive electrode 311, the inductive electrode 311 may include a plurality of sequentially connected inductive sub-electrodes (four inductive sub-electrodes shown in FIG. 3), each of which has a diamond shape; For one drive electrode 312, the drive electrode 312 may include four sequentially connected drive sub-electrodes, each of which has a diamond shape.

It should be noted that, in other implementations, for each of the inductive electrodes, each of the inductive sub-electrodes thereof may have a strip shape, or some of the inductive sub-electrodes may have a diamond shape and the other inductive sub-electrodes may have a strip shape, which is not specifically limited herein. Similarly, for one of the drive electrodes, each of the drive sub-electrodes thereof may have a strip shape, or some of the drive sub-electrodes may have a diamond shape, and the other drive sub-electrodes may have a strip shape, as long as the pattern of the inductive sub-electrodes and the drive sub-electrodes may cover the display area of the touch display panel.

In the touch display panel shown in FIG. 3, for each of the inductive electrodes 311, the inductive electrode 311 intersecting the drive electrode 312 may include at least one electrode area 313. As shown in FIG. 3, one inductive electrode 311 includes three electrode areas 313, and the three inductive electrodes 311 include nine electrode areas 313. The inductive electrode and the drive electrode, corresponding to each of the electrode areas 313, do not connect each other.

It should be noted that a plurality of electrode areas 313 of the inductive electrodes 311 and the drive electrodes 312 shown in FIG. 3 are generally bridges for connecting to a plurality of inductive sub-electrodes. In the embodiment of the disclosure, a plurality of electrode areas 313 may be regarded as a part of the inductive electrodes 311. The inductive capacitance may be generated between the electrode areas 313 and the cathode. When the display touch surface is touched, the interference of cathode may occur to the inductive electrodes 311 by means of the electrode areas 313.

In the touch display panel shown in FIG. 3, at least one excavated area 321 may be included in the cathode layer 32, and the position of each excavated area 321 corresponds to the position of one electrode area 313, respectively. As shown in FIG. 3, the cathode layer 32 includes nine excavated areas 321. There is a one-to-one correspondence between the position of each of the excavated areas 321 and the positions of the nine electrode areas 313 included in the electrode layer 31. In this way, the relative area between the cathode and the electrode areas may be reduced, thereby reducing the relative area between the cathode and the inductive electrodes, and reducing the interference of the cathode to the inductive electrodes.

The number of the excavated areas 321 included in the cathode described in FIG. 3 is the same as that of the electrode areas 313. In other implementations, the number of the excavated areas 321 may be less than that of the electrode areas 313. In this way, the relative area between the cathode and the inductive electrodes may also be reduced, thereby reducing the interference of the cathode to the inductive electrodes.

In FIG. 3, for one of the excavated areas 321, the shape of the excavated area 321 may be the same as that of the electrode area 313 which has a position corresponding to that of the excavated area 321. As shown in FIG. 3, the electrode area 313 may have a strip shape, and the excavated area 321 may also have a strip shape. In addition, the area of the excavated area 321 may also be the same as that of the electrode area 313 which has a position corresponding to that of the excavated area 321, so that the relative area between the excavated area 321 and the electrode area 313 may be minimized, thereby effectively reducing the relative area between the cathode and the inductive electrodes.

In addition, the area of the excavated area 321 may also be smaller than that of the electrode area 313 which has a position corresponding to that of the excavated area 321, to reduce the area of the excavated areas of the cathode, thereby avoiding damage to the display function of the cathode.

The cathode layer 32 shown in FIG. 3 may include a plurality of excavated areas 322 in addition to a plurality of excavated areas 321, and the position of each of the excavated areas 322 may correspond to that of one of the inductive sub-electrodes. Specifically, the number of the excavated areas 322 may not be greater than that of the inductive sub-electrodes which may be determined according to actual needs, and is not specifically limited herein. For one of the excavated areas 322, the shape of the excavated area 322 may be the same as the shape of the inductive sub-electrode 311 which has a position corresponding to that of the excavated area 322, and the area of the excavated area 322 may be smaller than that of the inductive sub-electrode 311. In this way, based on the cathode area corresponding to the electrode area being excavated, the cathode area corresponding to the at least one inductive sub-electrode is excavated, thereby effectively reducing the relative area between the inductive electrodes and the cathode, thereby reducing the interference of the cathode to the inductive electrodes.

It should be noted that, in practical applications, it may be preferable to make the cathode portion be excavated corresponding to the electrode areas where the inductive electrodes and the drive electrodes overlap, because the interference of the cathode area corresponding to the positions of the electrode areas to the inductive electrodes is more obvious than the interference of the cathode area corresponding to the positions of the inductive sub-electrodes to the inductive electrodes. Therefore, in order to effectively reduce the interference of the cathode to the inductive electrodes, and to avoid damage to the display function of the cathode as far as possible, preferably, the area of the positions of the cathode corresponding to the electrode areas may be excavated.

The touch display panel provided by the embodiment of the disclosure includes a cathode, a plurality of inductive electrodes, and a plurality of drive electrodes, wherein a plurality of inductive electrodes and a plurality of drive electrodes are located in a conductive layer, intersect each other and include at least one intersecting electrode area; the cathode includes at least one excavated area, the position of each of which corresponds to the position of one of the electrode areas.

Thus, with the area of the cathode corresponding to the overlapping portions of the inductive electrodes and the drive electrodes, the relative area between the cathode and the inductive electrodes may be reduced, thereby reducing the inductive capacitance between the cathode and the inductive electrodes. In this way, when the touch display panel is touched, owing to the reduction of the inductive capacitance between the cathode and the inductive electrodes, the interference of the cathode to the inductive electrodes can be reduced. Compared to the prior art, the change in the capacitance detected by the inductive electrodes can be increased, the detection sensitivity of the inductive electrodes can be increased, thereby improving the touch sensitivity of the touch display panel.

It should be noted that, in order to further reduce the interference of the cathode to the touch electrodes, in other embodiments of the disclosure, the interior of at least one touch electrode in the touch display panel may be excavated, the inductive capacitance between the cathode and the touch electrodes may be reduced by reducing the relative area between the cathode and the touch electrodes, thereby reducing the interference of the cathode to the touch electrodes and improving the touch sensitivity of the touch display panel. Please refer to FIG. 4 for details.

Figure 4:
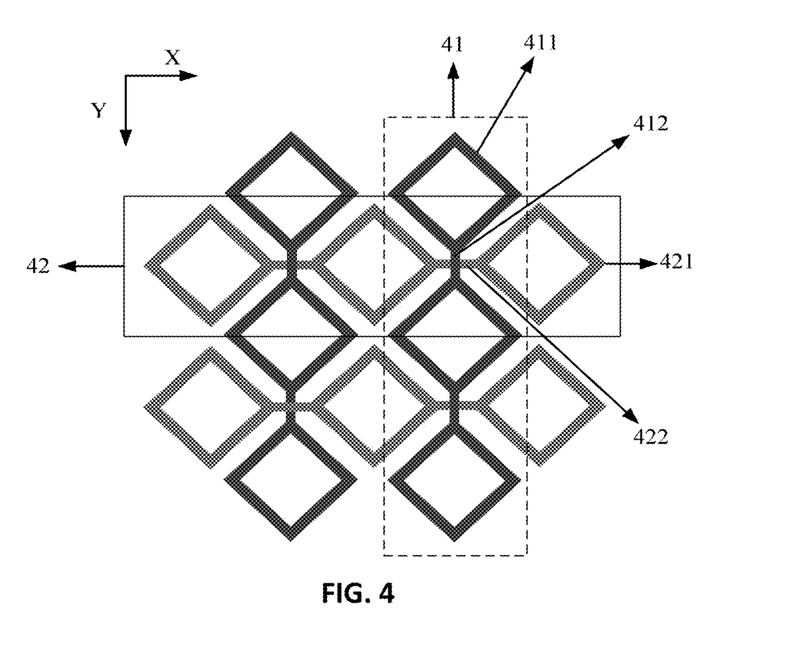
FIG. 4 is a schematic structural view of still another touch display panel according to an embodiment of the disclosure.

FIG. 4 is a schematic structural view of still another touch display panel according to an embodiment of the disclosure.

As shown in FIG. 4, the touch display panel includes a plurality of (only two are shown in FIG. 4) inductive electrodes 41 arranged along a first direction (X direction as shown in FIG. 4) and a plurality of (only two are shown in FIG. 4) drive electrodes 42 arranged along a second direction (Y direction as shown in FIG. 4), and a plurality of inductive electrodes 41 and a plurality of drive electrodes 42 may be intersected with each other, the first direction may be perpendicular to the second direction.

Each of the inductive electrodes 41 may include a plurality of inductive sub-electrodes 411, and each of the drive electrodes 42 may include a plurality of drive sub-electrodes 421. Each of the inductive sub-electrodes 411 and each of the drive sub-electrodes 421 may have a diamond shape. In other implementations, each of the inductive sub-electrodes 411 and each of the drive sub-electrodes 421 may also have a strip shape, which is not specifically limited herein.

In FIG. 4, for one of the inductive electrodes 41, the interior of the three inductive sub-electrodes 411 included therein may be excavated, so that the relative area between the inductive electrode 41 and the cathode may be minimized to the maximum extent. In other implementations, for the inductive sub-electrodes included in the one inductive electrode, the interior of some of the inductive sub-electrodes may be excavated and the interior of the other of the inductive sub-electrodes may not be excavated. And the number of the inductive sub-electrodes with the interior being excavated may be determined according to actual conditions and is not specifically limited herein. The inductive sub-electrodes with the interior being excavated may be adjacent inductive sub-electrodes or non-adjacent inductive sub-electrodes, and are not specifically limited herein.

In the embodiment of the disclosure, for one of the inductive electrodes 41, a plurality of inductive sub-electrodes 411 included may be sequentially connected by first conductive bridges 412, and for one of the drive electrodes 42, a plurality of drive sub-electrodes 421 included may be sequentially connected by second conductive bridges 422, wherein the first conductive bridges 412 and the second conductive bridges 422 are insulated from each other.

A plurality of inductive electrodes 41 and a plurality of drive electrodes 42 shown in FIG. 4 may be located in the same conductive layer, and the first conductive bridges 412 and the second conductive bridges 422 may be located in different conductive layers. For example, if a plurality of inductive electrodes 41 and a plurality of drive electrodes 42 are located in the conductive layer A, the first conductive bridges 412 may be located in the conductive layer A, and the second conductive bridges 422 may be located in the conductive layer B (or, the first conductive bridges 412 may be located in the conductive layer B and the second conductive bridges 422 may be located in the conductive layer A). The positional relationship of the conductive layer A, the conductive layer B and the cathode in the touch display panel from top to bottom may be: the conductive layer A, the conductive layer B, the cathode; or the conductive layer B, the conductive layer A, the cathode.

A plurality of inductive electrodes 41 and a plurality of drive electrodes 42 shown in FIG. 4 may also be located in different conductive layers, and the first conductive bridges 412 and the second conductive bridges 422 are also located in different conductive layers. For example, if a plurality of inductive electrodes 41 are located in the conductive layer A, the first conductive bridges 412 are also located in the conductive layer A. If a plurality of drive electrodes 41 are located in the conductive layer B, the second conductive bridges 422 are also located in the conductive layer B. The positional relationship of the conductive layer A, the conductive layer B, and the cathode in the touch display panel from top to bottom may be: the conductive layer A, the conductive layer B, and the cathode.

In the embodiment of the disclosure, based on the interior of the inductive electrodes being excavated to reduce the interference of the cathode to the inductive electrodes, in order to reduce the interference of the cathode to the drive electrodes, the interior of at least one drive electrode in the touch display panel may be excavated. The size of excavated area of the interior of the drive electrodes may be determined according to actual needs, and is not specifically limited herein.

As shown in FIG. 4, the interior of all of the three drive sub-electrodes 421 included in each of the drive electrodes 42 in FIG. 4 may be excavated. In this way, the relative area between the drive electrodes 42 and the cathode may be reduced to the maximum extent, thereby reducing the interference of the cathode to the drive electrodes 42. In other implementations, for the drive sub-electrodes included in one drive electrode, the interior of some of the drive sub-electrodes may be excavated, the interior of another drive sub-electrodes may not be excavated. And the number of the drive sub-electrodes with the interior being excavated may be determined according to actual conditions and is not specifically limited herein. The drive sub-electrodes with the interior being excavated may be adjacent drive sub-electrodes or non-adjacent drive sub-electrodes, and are not specifically limited herein.

It should be noted that, in practical applications, for the entire touch display panel, the interior of the inductive sub-electrodes included therein may be excavated, and the interior of the drive sub-electrodes is not excavated; or the interior of the inductive sub-electrodes and the interior of the inductive electrodes may be excavated; or a part of the interior of the inductive sub-electrodes is excavated and a part of the interior of the drive sub-electrodes is excavated, which is not specifically limited in the embodiment of the disclosure.

In another embodiment provided by the disclosure, based on the interior of at least one of the inductive sub-electrodes included in the touch display panel being excavated, or based on the interior of at least one of the inductive sub-electrodes included in the touch display panel being excavated and the interior of at least one of the drive sub-electrodes included in the touch display panel being excavated, the structure of the adjacent inductive sub-electrodes and the drive sub-electrodes may be nested with each other in order to further increase the touch sensitivity of the touch display panel.

Specifically, the adjacent drive sub-electrodes and the inductive sub-electrodes are nested with each other, and may include:

The sides of the drive sub-electrodes and the sides of the adjacent inductive sub-electrodes each have a concavo-convex structure, and the two concavo-convex structures have a consistent shape and match each other.

The convex portion of the drive sub-electrodes may be nested in the concave portion of the inductive sub-electrodes, and the convex portion of the inductive sub-electrodes may be nested in the concave portion of the drive sub-electrodes. The concave portion and the convex portion of the concavo-convex structure may be rectangular, square, curved or other shapes, and are not specifically limited herein.

In this way, by the inductive sub-electrodes and the adjacent drive sub-electrodes being designed to be a concavo-convex structure, on the one hand, the relative area between the inductive sub-electrodes and the drive sub-electrodes may be increased, and on the other hand, the distance between the inductive sub-electrodes and the drive sub-electrodes may be shortened. The mutual capacitance between the inductive electrodes and the drive electrodes may be effectively increased. When the touch display device is touched, the capacitance change detected by the inductive electrodes may be increased, and the detection sensitivity of the inductive electrodes and the touch sensitivity of the touch display panel may be effectively improved.

Figure 5:
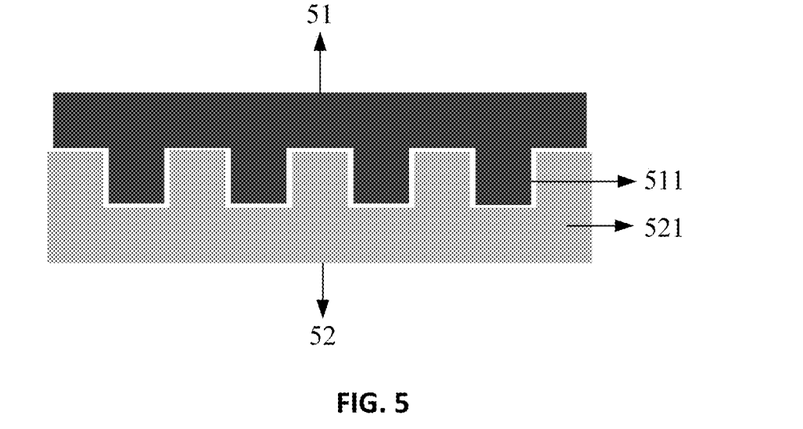
FIG. 5 is a schematic structural view of adjacent drive sub-electrodes and inductive sub-electrodes in a touch display panel according to an embodiment of the disclosure.

FIG. 5 is a schematic structural view of adjacent drive sub-electrodes and inductive sub-electrodes in a touch display panel according to an embodiment of the disclosure.

As shown in FIG. 5, mark 51 in FIG. 5 may refer to a side of the inductive sub-electrode 411 shown in FIG. 4, mark 52 may refer to a side of the drive sub-electrode 421 shown in FIG. 4. The side 51 has a plurality of rectangular concavo-convex structures 511, and the side 52 has a plurality of rectangular concavo-convex structure 521, and the above two concavo-convex structures match each other. In this way, the relative area between the inductive sub-electrode 411 shown in FIG. 4 and the drive sub-electrode 421 shown in FIG. 4 may be increased, and the distance between the inductive sub-electrode 411 and the drive sub-electrode 421 may be shortened, thereby increasing the induced capacitance between the inductive sub-electrode 411 and the drive sub-electrode 421.

For the entire touch display panel shown in FIG. 4, at least one of a side of the inductive sub-electrodes 411 and a side of the adjacent drive sub-electrode 421 may be configured as the above-described concavo-convex structure. Preferably, each of the sides of inductive sub-electrodes 411 and the sides of the drive sub-electrodes 421 connected thereto may be configured as the concavo-convex structure, so that the mutual capacitance between a plurality of drive electrodes and a plurality of inductive electrodes in the touch display panel may be maximized, thereby improving the touch sensitivity of the touch display panel.

In an embodiment of the disclosure, the adjacent drive sub-electrodes and the inductive sub-electrodes are nested with each other, and may further include:

A side of the drive sub-electrodes and a side of the adjacent inductive sub-electrodes are all spiral structures, and both of the two spiral structures have the same shape and match each other.

The spiral wall of the drive sub-electrode may be nested into a gap of the spiral wall of the inductive sub-electrode, the spiral wall of the inductive sub-electrode may be nested into a gap of the spiral wall of the drive sub-electrode, and two different spiral walls may constitute a Fermat spiral structure.

In this way, by the inductive sub-electrodes and the adjacent drive sub-electrodes being designed to be a spiral structure, on the one hand, the relative area between the inductive sub-electrodes and the drive sub-electrodes may be increased, and on the other hand, the distance between the inductive sub-electrodes and the drive sub-electrodes may be shortened. The mutual capacitance between the inductive electrodes and the drive electrodes may be effectively increased. When the touch display device is touched, the capacitance change detected by the inductive electrodes may be increased, and the detection sensitivity of the inductive electrodes and the touch sensitivity of the touch display panel may be effectively improved.

Figure 6:
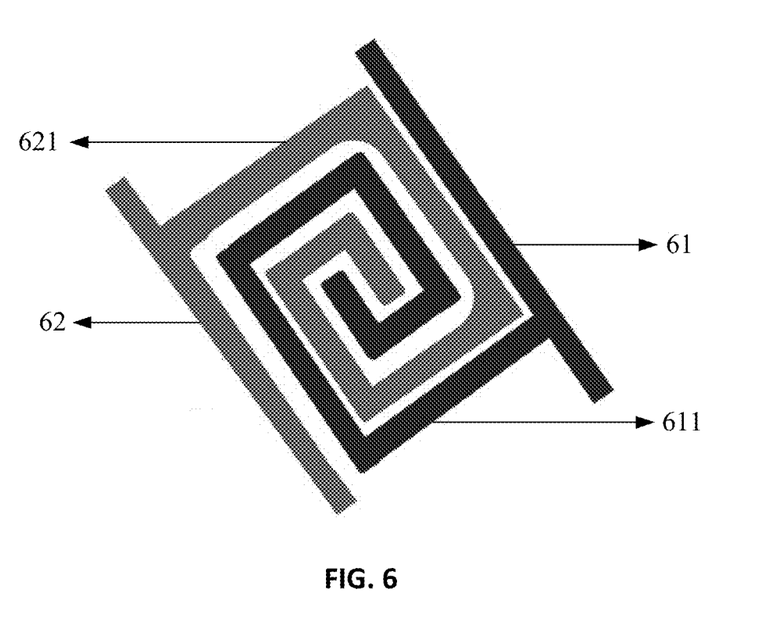
FIG. 6 is a schematic structural view of adjacent drive sub-electrodes and inductive sub-electrodes in another touch display panel according to an embodiment of the disclosure.

FIG. 6 is a schematic structural view of adjacent drive sub-electrodes and inductive sub-electrodes in a touch display panel according to an embodiment of the disclosure.

As shown in FIG. 6, mark 61 in FIG. 6 may refer to a side of the inductive sub-electrode 411 shown in FIG. 4, mark 62 may refer to a side of the drive sub-electrode 421 shown in FIG. 4, and the side 61 is a spiral structure and has a spiral wall 611, the side 62 is a spiral structure and has a spiral wall 621. The spiral wall 611 and the spiral wall 621 have the same shape, and the spiral wall 611 is nested into a gap of the spiral wall 621, and the spiral wall 621 is nested into a gap of the spiral wall 611. In this way, the relative area between the inductive sub-electrode 411 shown in FIG. 4 and the drive sub-electrode 421 shown in FIG. 4 may be increased, and the distance between the inductive sub-electrode 411 and the drive sub-electrode 421 may be shortened, thereby increasing the induced capacitance between the inductive sub-electrode 411 and the drive sub-electrode 421.

For the touch display panel shown in FIG. 4, the side of the at least one inductive sub-electrode 411 and the side of the adjacent drive sub-electrode 421 may be configured as the spiral structure described above, preferably, the side of each inductive sub-electrode 411 and the side of the drive sub-electrode 421 connected thereto may be configured as the spiral structure described above, so that the mutual capacitance between a plurality of drive electrodes and a plurality of inductive electrodes in the touch display panel may be maximized, thereby improving the touch sensitivity of the touch display panel.

It should be noted that, in practical applications, for the entire touch display panel, the side of all the drive sub-electrodes and the side of the adjacent inductive sub-electrodes may be configured as a concavo-convex structure, or a spiral structure, or the side of a part of the drive sub-electrodes and the side of the adjacent inductive sub-electrodes be configured as a concavo-convex structure, and the side of the other drive sub-electrodes and the side of the adjacent inductive sub-electrodes may be configured as a spiral structure, and the embodiment of the disclosure is not specifically limited thereto.

The touch display panel provided by the embodiment of the disclosure includes a cathode and a plurality of inductive electrodes, and the interior of at least one of the inductive electrodes is excavated to reduce a relative area between the inductive electrode and the cathode. In the embodiment of the disclosure, with the interior of the inductive electrodes of the touch display panel being excavated, the relative area between the inductive electrodes and the cathode of the touch display panel may be reduced, thereby reducing the inductive capacitance between the inductive electrodes and the cathode. In this way, when the touch display panel is touched, since the inductive capacitance between the cathode and the inductive electrodes becomes smaller, a significant change in capacitance may be detected by the inductive electrodes, thereby effectively reducing the interference of the cathode to the inductive electrodes, thereby improving the detection sensitivity of the inductive electrodes and the touch sensitivity of the touch display panel.

In an embodiment of the disclosure, to reduce the influence of the cathode in the touch display panel on the touch electrodes, the material of the encapsulation layer between the cathode and the touch electrodes may be a material with a low dielectric constant which may range from 3 to 8. The material with a low dielectric constant may be silicon oxide or silicon oxynitride. The material may also be other materials with a low dielectric constant.

Thus the inductive capacitance between the cathode and the touch electrodes in the touch layer on the display panel may be reduced. When the display panel is touched, the inductive capacitance between the cathode and the inductive electrodes and the inductive capacitance between the cathode and the drive electrodes are reduced, compared with the prior art, the interference of the cathode to the touch electrodes may be reduced, thereby reducing the damage to the touch function of the touch display panel and improving the touch sensitivity of the touch display panel.

In the embodiment of the disclosure, in order to further reduce interference between the cathode and the touch electrodes, the thickness of the encapsulation layer may be between 1 and 10 μm.

In addition, to increase the inductive capacitance between the touch electrodes (i.e., between the drive electrodes and the inductive electrodes), the insulation layer between the drive electrodes and the inductive electrodes may adopt a material with a high dielectric constant which may be greater than or equal to 30. And the material with a high dielectric constant may be silicon nitride or titanium oxide. The material may also be other materials with a high dielectric constant such as alumina, magnesia, zirconia, etc., which are not specifically limited herein.

In this way, the inductive capacitance between the inductive electrodes and the drive electrodes may be increased. When the touch display panel is touched, since the inductive capacitance between the inductive electrodes and the drive electrodes is increased, the interference of the cathode to the inductive electrodes and the drive electrodes may be reduced, thereby improving the touch sensitivity of the touch display panel.

In order to further increase the inductive capacitance between the inductive electrodes and the drive electrodes, the thickness of the insulation layer may also be set between 0.01 and 10 μm.

It should be noted that, in the existing touch display panel, because the distance between the display panel and the touch electrodes is relatively close, the drive signal in the display panel may likely interfere with the inductive electrodes in the touch electrodes, resulting in a damaged touch function.

In view of this, the embodiment of the disclosure also provides a touch display panel including a first conductive layer, a second conductive layer, and a display panel. The first conductive layer includes a plurality of inductive electrodes; the second conductive layer includes a plurality of a drive electrode; and the second conductive layer is located between the first conductive layer and the display panel; the orthographic projection area of a plurality of the inductive electrodes on the display panel falls into the orthographic projection area of a plurality of the drive electrodes on the display panel. Thus, since the drive electrodes are located between the inductive electrodes and the display panel, and the orthographic projection area of the inductive electrodes on the display panel falls into the orthographic projection area of the drive electrodes on the display panel, the electromagnetic field generated by the drive signals may be effectively blocked or absorbed by the drive electrodes. When the touch display panel is touched, the interference of the drive signal to the inductive electrodes may be effectively reduced thereby ensuring the touch function of the touch display panel.

Please refer to FIG. 7 to FIG. 11.

Figure 7:
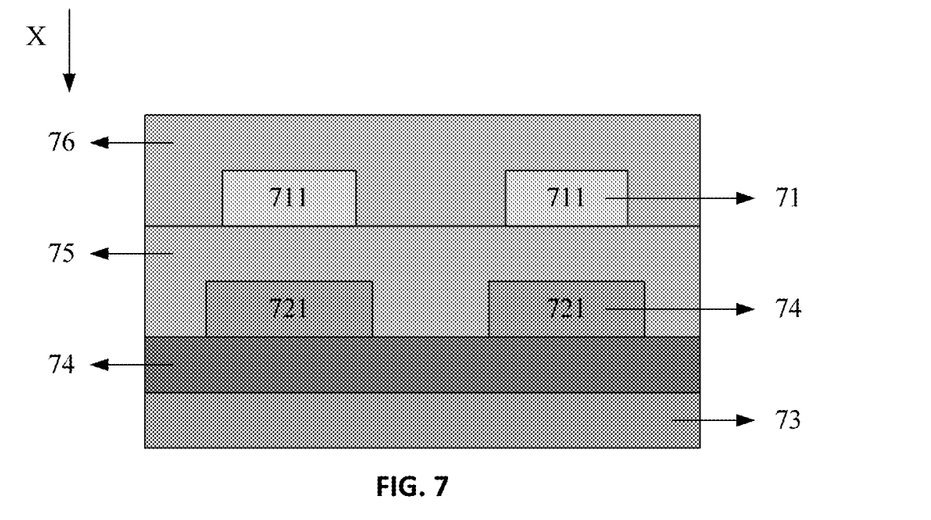
FIG. 7 is a side view of a touch display panel according to an embodiment of the disclosure.
Figure 8:
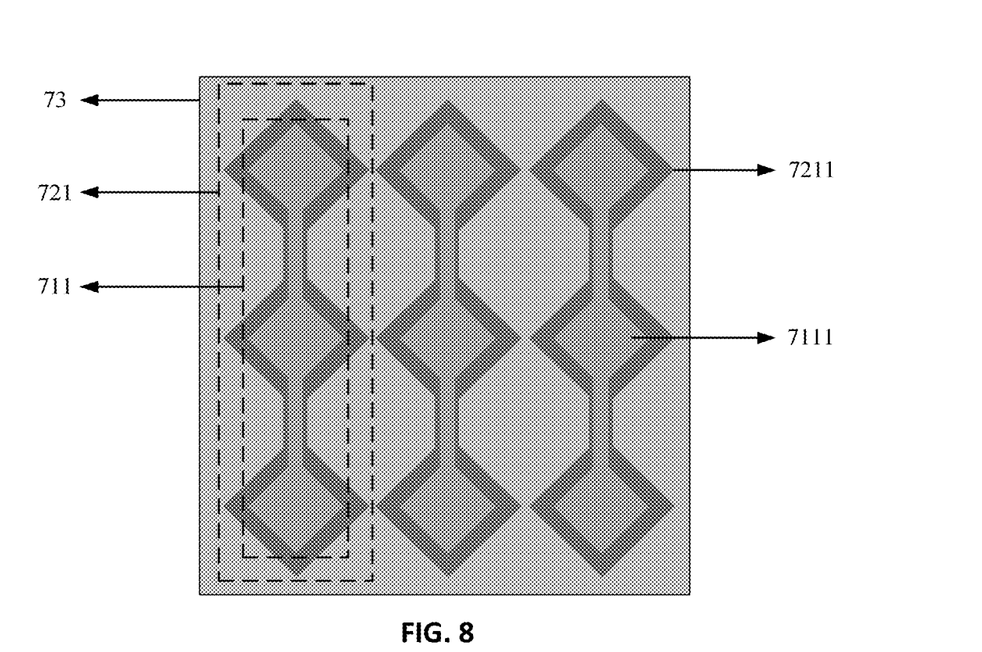
FIG. 8 is a top view of a touch display panel according to an embodiment of the disclosure.

FIG. 7 is a side view of a touch display panel according to an embodiment of the disclosure. FIG. 8 is a top view of a touch display panel as shown in FIG. 7. The touch display panel is as follows.

In FIG. 7, the touch display panel may include a first conductive layer 71, a second conductive layer 72 and a display panel 73. The first conductive layer 71 includes a plurality of inductive electrodes 711, and the second conductive layer 72 includes a plurality of drive electrode 721. The second conductive layer 72 is located between the first conductive layer 71 and the display panel 73. In addition, the touch display panel shown in FIG. 7 may further include an encapsulation layer 74, an insulation layer 75, and a protective layer 76. The encapsulation layer 74 is located between the second conductive layer 72 and the display panel 73. The encapsulation layer 74 may be a thin film encapsulation layer for encapsulating the display panel, or a base layer among the touch layer and the thin film encapsulation layer, and may also include both the thin film encapsulation layer and the base layer which is not specifically limited here.

The insulation layer 75 is located between the first conductive layer 71 and the second conductive layer 72 for insulating the inductive electrodes 711 from the drive electrodes 721. The protective layer 76 covers the first conductive layer 71 for protecting the inductive electrodes 711.

In the embodiment of the disclosure, an orthographic projection area of a plurality of the inductive electrodes 711 on the display panel 73 falls into an orthographic projection area of a plurality of the drive electrodes 721 on the display panel 73. Specifically:

The X direction in FIG. 7 may be regarded as the orthogonal projection direction of the inductive electrodes 711 on the display panel 73, and the orthogonal projection direction of the drive electrodes 721 on the display panel 73. As can be seen from FIG. 7, a width of the orthographic projection area of the inductive electrodes 711 on the display panel 73 falls into a width of the orthographic projection area of the drive electrodes 721 on the display panel 73.

FIG. 8 is a top plan view of the touch display panel shown in FIG. 7, wherein a direction perpendicular to the display panel 73 may be regarded as an orthographic projection direction of the inductive electrodes 711 on the display panel 73, and an orthographic projection direction of the drive electrodes 721 on the display panel 73. As can be seen in conjunction with FIGS. 7 and 8, the orthographic projection area of the inductive electrodes 711 on the display panel 73 falls into the orthographic projection area of the drive electrodes 721 on the display panel 73.

Thus, since the drive electrodes 721 are located between the inductive electrodes 711 and the display panel 73, and the orthographic projection area of the inductive electrodes 711 on the display panel 73 falls into the orthographic projection area of the drive electrodes 721 on the display panel 73. The electromagnetic field generated by the drive signals on the display panel 73 may be effectively blocked or absorbed by the drive electrodes 721, thereby weakening the influence of the electromagnetic field on the inductive electrodes. When the touch display panel is touched, the interference of the drive signal to the inductive electrodes 711 may be effectively reduced thereby ensuring the touch function of the touch display panel.

In the touch display panel shown in FIG. 8, each of the inductive electrodes 711 may further include a plurality of inductive sub-electrodes 7111 sequentially connected, and each of the drive electrodes 721 may further include a plurality of drive sub-electrodes 7211 sequentially connected. The number of the inductive sub-electrodes 7111 included in one inductive electrode 711 is same as the number of the drive sub-electrodes 7211 included in one drive electrode 721, and the number of the inductive sub-electrodes 7111 included in the touch display panel is same as the number of the drive sub-electrodes 7211 included therein.

It can be seen in conjunction with FIG. 7 and FIG. 8, as to one of the drive sub-electrodes 7211, the number of the inductive sub-electrodes 7111 corresponding to the position of the drive sub-electrode 7211 is one along the orthographic projection direction, and the orthographic projection area of the inductive sub-electrode 7111 on the display panel 73 falls into the orthographic projection area of the drive sub-electrode 7211 corresponding to the position thereof on the display panel 73.

Since the orthographic projection area of each of the inductive sub-electrodes 7111 on the display panel 73 falls into the orthographic projection area of one drive sub-electrode 7211 on the display panel 73, for each of the drive sub-electrodes 7211, the electromagnetic field generated by the drive signals which has an interference to the one inductive electrode 7111 may be effectively blocked or absorbed, thereby reducing the interference of the electromagnetic field to the inductive sub-electrode 7111. For the entire touch display panel, the interference of the drive signal to the inductive electrodes 711 may be effectively reduced.

In the touch display panel shown in FIG. 8, each of the inductive sub-electrodes 7111 and each of the drive sub-electrodes 7211 have a diamond shape. In other embodiments, each of the inductive sub-electrodes 7111 and each of the drive sub-electrodes 7211 may have a strip shape, or each of the inductive sub-electrodes 7111 has a diamond shape, and each of the drive sub-electrodes 7211 may have a strip shape, or the like, which is not specifically limited in the embodiment of the disclosure, as long as such a case is satisfied: the orthographic projection area of the inductive electrodes 711 on the display panel 73 may fall into the orthographic projection area of the drive electrodes 721 on the display panel 73.

In other embodiments of the disclosure, the number of the inductive sub-electrodes included in at least one inductive electrode of the touch display panel may be greater than the number of the drive sub-electrodes included in one of the drive electrodes, and the orthographic projection area of at least one inductive sub-electrode on the display panel falls into the orthographic projection area of one of the drive sub-electrodes on the display panel.

Figure 9:
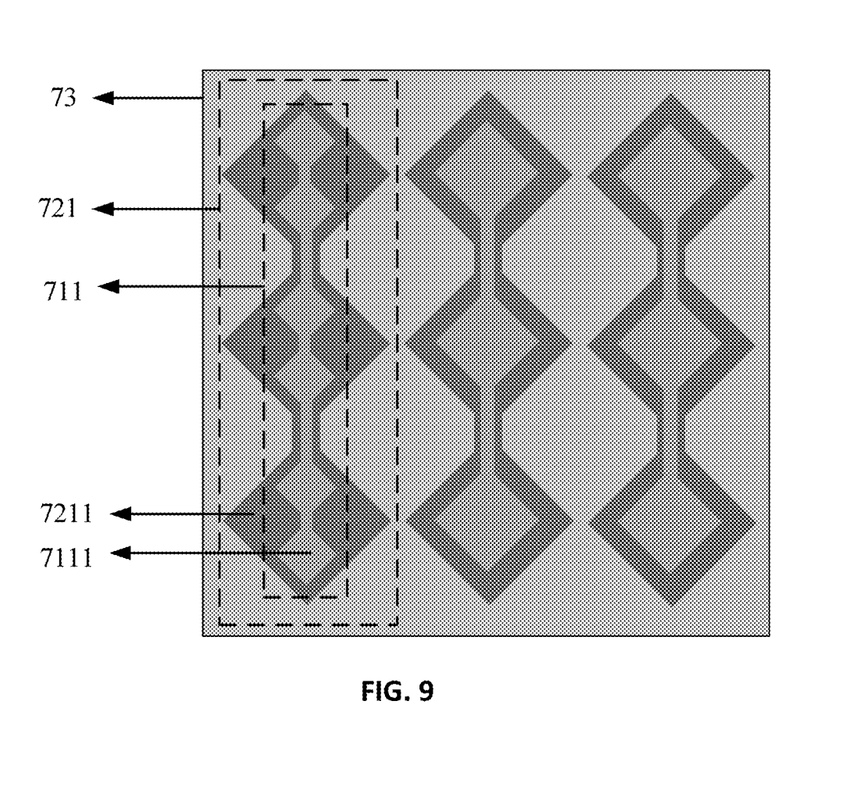
FIG. 9 is a top view of another touch display panel according to an embodiment of the disclosure.

FIG. 9 is another top view of the touch display panel shown in FIG. 7. In FIG. 9, the number of the inductive sub-electrodes 7111 included in the inductive electrode 711 is larger than the number of the drive sub-electrodes 7211 included in the drive electrode 721, and the direction perpendicular to the display panel 73 may be the orthogonal projection direction of the inductive electrode 711 on the display panel 73 and the orthogonal projection direction of the drive electrode 721 on the display panel 73.

As to the drive sub-electrode 7211 shown in FIG. 9, the number of the inductive sub-electrodes 7111 corresponding to the position of the drive sub-electrode 7211 in the orthogonal projection direction is two, and the orthogonal projection area of the two inductive electrodes 7111 on the display panel 73 falls into the orthographic projection area of the drive sub-electrode 7211 on the display panel 73.

Since the orthographic projection area of every two inductive sub-electrodes 7111 on the display panel 73 falls into the orthographic projection area of one drive sub-electrode 7211 on the display panel 73, for each of the drive sub-electrodes 7211, the electromagnetic field generated by the drive signals which has an interference to the two inductive sub-electrodes 7111 may be effectively blocked or absorbed, thereby reducing the interference of the electromagnetic field to the two inductive sub-electrodes 7111. For the entire touch display panel, the interference of the drive signal to the inductive electrodes 711 may be effectively reduced.

In another embodiment provided by the disclosure, the second conductive layer in the touch display panel shown in FIG. 7 may further include a plurality of filling blocks, wherein:

A plurality of filling blocks are filled in the gaps between a plurality of drive electrodes;

A plurality of filling blocks are insulated from each other, and a plurality of filling blocks and a plurality of drive electrodes are insulated from each other.

Figure 10:
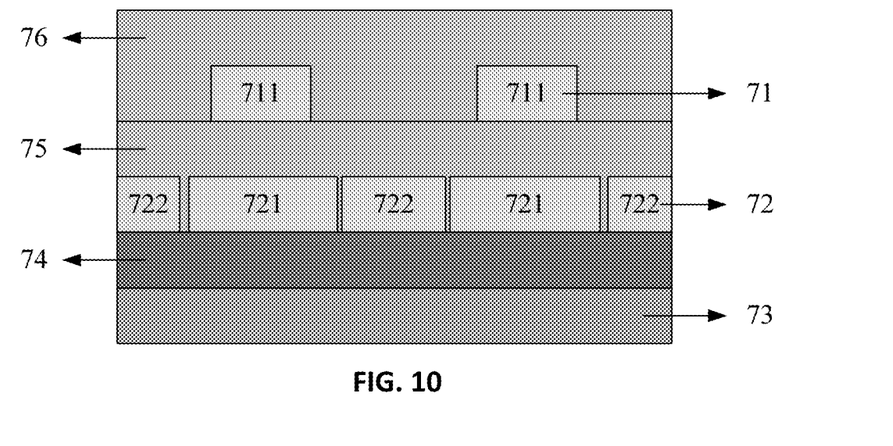
FIG. 10 is a side view of another touch display panel according to an embodiment of the disclosure.
Figure 11:
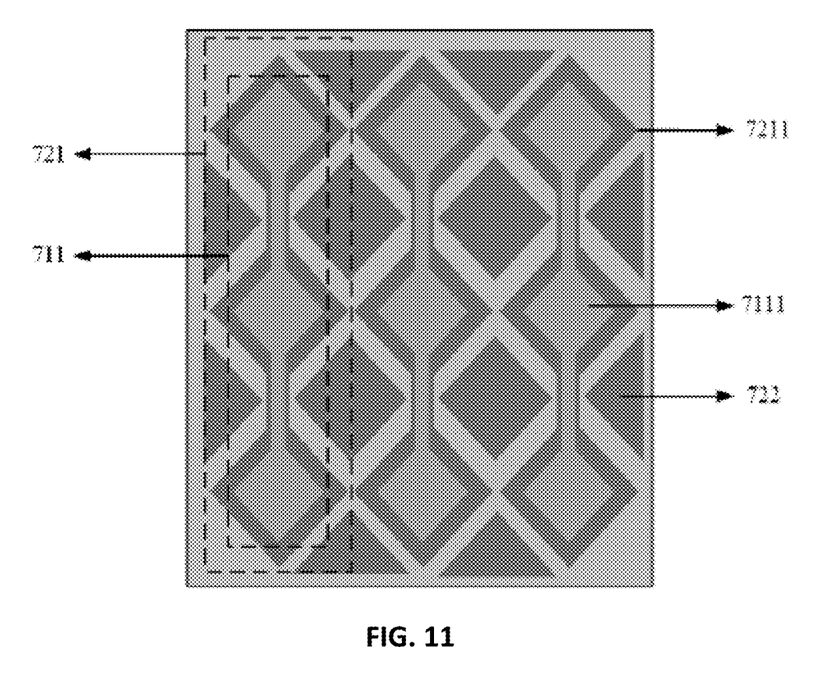
FIG. 11 is a top view of still another touch display panel according to an embodiment of the disclosure.

As shown in FIG. 10, as compared with FIG. 7, in FIG. 10, a plurality of filling blocks 722 are included, the materials of filling blocks 722 may be same as those of the drive electrodes 721. The touch display panel may include a first conductive layer 71, a second conductive layer 72 and a display panel 73. The first conductive layer 71 includes a plurality of inductive electrodes 711, and the second conductive layer 72 includes a plurality of drive electrode 721. The second conductive layer 72 is located between the first conductive layer 71 and the display panel 73. In addition, the touch display panel shown in FIG. 10 may further include an encapsulation layer 74, an insulation layer 75, and a protective layer 76. FIG. 11 is a top plan view of the touch display panel as shown in FIG. 10. As can be seen from FIG. 11, for each of the filling blocks 722, it may be filled in the gap between the drive electrodes 721, but insulated from each of the drive electrodes 721. And a plurality of filling blocks 722 may be insulated from each other. It also can be seen that each of the inductive electrodes 711 may further include a plurality of inductive sub-electrodes 7111 sequentially connected, and each of the drive electrodes 721 may further include a plurality of drive sub-electrodes 7211 sequentially connected.

Since a plurality of filling blocks 722 are electrically conductive and are filled in the gaps of a plurality of drive electrodes 721, the electromagnetic field of the drive signal between the gaps of a plurality of drive electrodes 721 may be effectively blocked or absorbed, and the electromagnetic field is prevented from passing through the gaps between a plurality of drive electrodes 721 to act on the inductive electrodes 711 and have interference to the inductive electrodes 711. In other words, after a plurality of filling blocks 722 are filled between a plurality of drive electrodes 721, the interference of the electromagnetic field generated by the drive signal to the inductive electrodes 711 may be more effectively reduced, thereby ensuring the touch function of the touch display panel.

The touch display panel provided by the embodiment of the disclosure includes: a first conductive layer, a second conductive layer, and a display panel. The first conductive layer includes a plurality of inductive electrodes; the second conductive layer includes a plurality of drive electrodes. The second conductive layer is located between the first conductive layer and the display panel. The orthographic projection area of a plurality of inductive electrodes on the display panel falls into the orthographic projection area of a plurality of drive electrodes on the display panel. Thus, since the drive electrodes are located between the inductive electrodes and the display panel, and the orthographic projection area of the inductive electrodes on the display panel falls into the orthographic projection area of the drive electrodes on the display panel, the electromagnetic field generated by the drive signals may be effectively blocked or absorbed by the drive electrodes. When the touch display panel is touched, the interference of the drive signal to the inductive electrodes may be effectively reduced thereby ensuring the touch function of the touch display panel.

Embodiment 3

The embodiment of the disclosure provides a touch display device which may include a touch display panel recorded in the above embodiment 1 or embodiment 2.

It will be apparent to a person skilled in the art that although preferred embodiments of the disclosure have been described, other modifications and changes may be made to the preferred embodiments as long as a person skilled in the art knows basic innovative concepts. Therefore, the appended claims are intended to be interpreted as including the preferred embodiments and the modifications and changes which fall into the protection scope of the disclosure.

It will be apparent to a person skilled in the art that various modifications and changes may be made to the disclosure without departing from the scope of the disclosure. Thus, the disclosure is intended to cover the modifications and changes of the disclosure if the modifications and changes made to the disclosure fall into the protection scope of the claims and the equivalent technology of the disclosure.

What is claimed is:

1. A touch display panel, comprising:
a cathode having one or more excavated areas, and
a plurality of touch electrodes, positions of the one or more excavated areas correspond to positions of the touch electrodes to reduce a relative area between the cathode and the touch electrodes so that a parasitic capacitance between the touch electrodes and the cathode is reduced,
wherein the touch electrodes include one or more inductive electrodes,
wherein the positions of the one or more excavated areas correspond to positions of the one or more inductive electrodes to reduce the relative area between the cathode and the one or more inductive electrodes,
wherein the parasitic capacitance is between the one or more inductive electrodes and the cathode, and
wherein the one or more inductive electrodes are under an influence of electrostatic induction when a touching of the touch display panel occurs.

2. The touch display panel according to claim 1, wherein the positions of the one or more of the excavated areas correspond to the position of one inductive electrode.

3. The touch display panel according to claim 2, wherein shapes of the one or more excavated areas are same as a shape of the one inductive electrode corresponding to the positions thereof, and an area of the one or more excavated areas corresponding to the one inductive electrode is not larger than an area of the one inductive electrode, wherein the area of the one or more excavated areas are determined depending on a predetermined detection sensitivity of the touch display.

4. The touch display panel according to claim 1, wherein the touch electrodes further include one or more drive electrodes, wherein
a plurality of the drive electrodes and a plurality of the inductive electrodes are located in the same conductive layer; or
a plurality of the drive electrodes and a plurality of the inductive electrodes are located in different conductive layers.

5. The touch display panel according to claim 4, wherein each of the inductive electrodes that intersects at least one of the drive electrodes includes one or more electrode areas, and each of the one or more excavated areas has a position corresponding to a position of one of the electrode areas, wherein the parasitic capacitance is between the one or more electrode areas and the cathode.

6. The touch display panel of claim 5, wherein the shapes of the one or more excavated areas are the same as the shapes of the one or more electrode areas corresponding to the positions thereof, and the area of the one or more excavated areas is not larger than the area of the one or more electrode areas.

7. The touch display panel according to claim 6, wherein each of the inductive electrodes includes a plurality of sequentially connected inductive sub-electrodes, and a shape of the inductive sub-electrodes includes at least one of a diamond shape and a strip shape;
each of the drive electrodes comprises a plurality of sequentially connected drive sub-electrodes, and a shape of the drive sub-electrodes includes at least one of a diamond shape and a strip shape.

8. The touch display panel according to claim 7, wherein a plurality of the inductive electrodes are along a first direction, a plurality of the drive electrodes are along a second direction, and the first direction and the second direction intersect each other.

9. The touch display panel according to claim 7, wherein a plurality of the inductive electrodes and a plurality of the drive electrodes are made of transparent conductive material or metal material.

10. The touch display panel according to claim 7, wherein a plurality of the electrode areas intersecting the inductive electrodes with the drive electrodes include bridges for connecting a plurality of the inductive sub-electrodes.

11. The touch display panel according to claim 7, wherein a plurality of the inductive sub-electrodes are sequentially connected by first conductive bridges, and a plurality of the drive sub-electrodes are sequentially connected by second conductive bridges, wherein the first conductive bridges and the second conductive bridges are insulated from each other.

12. The touch display panel according to claim 11, wherein the first conductive bridges and the second conductive bridges are arranged in different conductive layers.

13. The touch display panel according to claim 7, wherein sides of the drive sub-electrodes and the inductive sub-electrodes have a concavo-convex structure, and the drive sub-electrodes is nested in the inductive sub-electrodes via a concave portion of the concavo-convex structure so that a mutual capacitance between the inductive electrodes and the drive electrodes is increased.

14. The touch display panel according to claim 7, wherein sides of the drive sub-electrodes and the inductive sub-electrodes have a spiral structure, and the drive sub-electrodes is nested in the inductive sub-electrodes via a spiral wall of the spiral structure so that a mutual capacitance between the inductive electrodes and the drive electrodes is increased.

15. The touch display panel according to claim 4, wherein a plurality of filling blocks are filled in gaps of the plurality of drive electrodes so that an electromagnetic field is prevented from passing through the gaps between the plurality of drive electrodes and having interference to the inductive electrodes.

16. A touch display device, comprising:
a touch display panel having a cathode having one or more excavated areas, and a plurality of touch electrodes, positions of the one or more excavated areas correspond to positions of the touch electrodes to reduce a relative area between the cathode and the touch electrodes so that a parasitic capacitance between the touch electrodes and the cathode is reduced,
wherein the touch electrodes include one or more inductive electrodes,
wherein the positions of the one or more excavated areas correspond to positions of the one or more inductive electrodes to reduce the relative area between the cathode and the one or more inductive electrodes,
wherein the parasitic capacitance is between the one or more inductive electrodes and the cathode, and
wherein the one or more inductive electrodes are under an influence of electrostatic induction when a touching of the touch display panel occurs.

* * * * *